Nov. 19, 1929.   A. MOORHOUSE   1,736,718
MOTOR VEHICLE
Filed Jan. 28, 1924
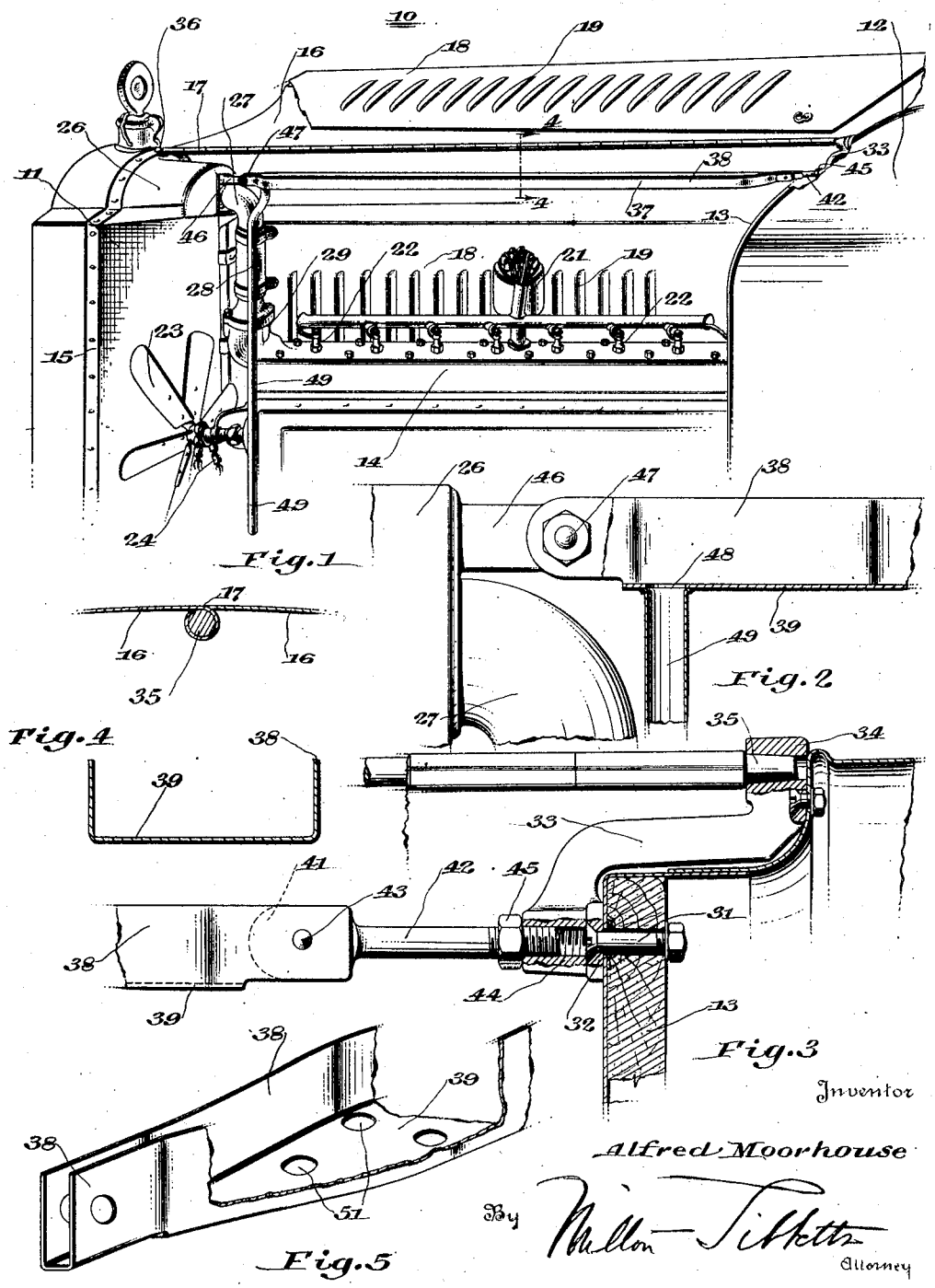
Inventor
Alfred Moorhouse
By
Attorney Patented Nov. 19, 1929

1,736,718

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN A CORPORATION OF MICHIGAN

MOTOR VEHICLE

Application filed January 28, 1924. Serial No. 688,988.

This invention relates to motor vehicles, more particularly to the bonnet structure thereof, and it has for an object to provide a brace member adapted to connect the dash of a motor vehicle with the radiator thereof which shall be adapted to prevent the leakage of water through the bonnet onto the engine of the vehicle.

Another object of the invention is to provide a drip trough adapted to catch water leaking through the joints of the bonnet and to drain such water to a point removed from the electrical apparatus of the engine.

Other objects of the invention will appear from the following description taken in connection with the drawings, which form a part of this specification, and in which:

Fig. 1 is a perspective view of a portion of a motor vehicle, showing the application of this invention thereto;

Fig. 2 is an enlarged side elevation of the forward end of the device illustrated in Fig. 1, showing the method of attachment to the vehicle radiator;

Fig. 3 is an enlarged view, partially in section and partially in elevation, of the rear end of the device illustrated in Fig. 1, showing the method of attachment to the motor vehicle dash;

Fig. 4 is a view in section substantially on the line 4—4 of Fig. 1, showing the trough member in position beneath the bonnet joint, and Fig. 5 is a perspective view, partially broken away, of a modified form of trough, having a different drainage means.

In the construction of modern motor vehicles, the engine is ordinarily placed at the forward end of the vehicle between the radiator thereof and the vehicle dash, and is adapted to be covered by a jointed hood or bonnet. The bonnet is made in sections and is jointed for the purpose of permitting one or more of the sections to be raised to provide easy access to the engine. When exposed to heavy storms, or when flooded with water for other reasons, such as occurs when the vehicle is being washed, a certain amount of water leaks through the joint connecting the sections of the bonnet, onto the engine. When the engine is hot and the vehicle is moving, such leakage is usually not serious as the heat and the air current from the engine fan rapidly dissipate this moisture. Under some circumstances, however, as when the vehicle is standing, the ignition apparatus in particular is exposed to such water, which may even render the engine temporarily inoperative. The present invention provides a device by which such leakage of water through the bonnet is caught and passed to a point where it can do no damage to the engine or to the accessories thereof.

Referring to the drawings, at 10 is shown a portion of a motor vehicle having at its forward end a radiator 11, of usual form, and having a cowl 12 terminating in the usual transversely disposed dash 13. The space between the radiator 11 and the dash 13 constitutes an engine compartment for the vehicle and herein is mounted the usual internal combustion engine 14. The engine compartment is adapted to be covered by a suitable hood or bonnet consisting of a pair of top sections 16, suitably joined as by the piano hinge 17, and a pair of side sections 18 each suitably joined to its adjacent top section 16 in any convenient manner (not shown). The front and rear edges of the sections 16 and 18 of the vehicle bonnet are adapted to rest, when in closed position, against suitable ledges 15 formed on the radiator shell and the vehicle cowl respectively. The side sections 18 of the bonnet may be provided, if desired, with louvres 19 by means of which heated air is permitted to escape from beneath the bonnet when closed.

The engine 14 is provided with the usual electrical apparatus, such as the ignition distributer 21 and the spark plugs 22. These are usually mounted on the engine head and are directly exposed to any water entering the engine compartment through the joint 17, as is well known. In the forward end of the engine compartment is mounted a fan 23, adapted to be driven in any convenient way, as by the belt 24, from the engine. This fan 23 assists in the passage of cooling air through the air spaces of the radiator 11, through the water spaces of which the cooling water for the engine is circulated by means of appropriate connections with the engine cylinder jackets. The upper end of the radiator 11 is provided with a horizontally disposed tank 26 having a suitable elbow connection 27, through which cooling water enters the radiator from the engine jackets by way of the hose connection 28, as clearly shown in Fig. 1. The hose 28 forms a connection with a housing 29, communicating through inside passages with the engine cooling jackets (not shown).

Suitably secured to the dash 13, as by the bolts 31, is a bracket 32, having an upwardly and rearwardly extending arm 33 on which is formed a lug 34 adapted to support the rear end of the hinge rod 35 of the joint 17. The forward end of this rod 35 is supported in a notch 36, formed in the ledge 15 on the shell of the radiator 11.

In order to accurately space the upper portions of the radiator 11 and the dash 13, and maintain the rear end of the hinge rod 35 seated in the lug 34, a brace member 37 is arranged under tension between the radiator 11 and the dash 13, as clearly shown in Fig. 1.

This tension member 37 extends the length of the engine compartment above the engine 14 and its associated parts, directly beneath the hinge joint 17 between the bonnet sections 16. This member 37 is formed with a channel section, having side walls 38 and a floor 39, as clearly shown in Fig. 4, which constitutes a trough adapted to catch any water which may leak through the joint 17.

At its rear end the floor 39 of the member 37 is narrowed and the side walls 38 are brought closer together to embrace a shank 41 formed on the end of a threaded rod 42. The shank 41 is welded or otherwise rigidly secured to the side walls 38 as indicated at 43. The end of the rod 42 is threaded into a suitable lug 44 on the bracket 32, and it may be provided with a lock nut 45. At the forward end of the member 37 the floor 39 of the trough is similarly narrowed and the walls 38 brought closer together to embrace a lug 46, rigidly secured to the radiator elbow connection 27 and preferably integral therewith. Both the lug 46 and the adjacent walls 38 of the trough are provided with alined holes for the reception of removable securing means, such as the bolt 47. By removing the bolt 47 the whole member 37 may be rotated to screw the rod 42 into or out of the lug 44, to adjust the length of the member.

The floor 39 of the trough is provided near its forward end with a suitable hole 48, which opens into the upper end of a drain pipe 49, secured to the floor 39 as by soldering. The pipe 49 extends downwardly beside the engine 14 and terminates at any convenient point near the base thereof.

The operation of this device will be apparent. The rear end of the trough 37 is disposed at a slightly higher level than the forward end thereof, so that any water entering the engine compartment through the hood joint 17 will be caught therein and will drain by gravity to the forward end of the trough, and thence through the pipe 49 to any suitable point. In this way danger of interference with or injury to the engine, particularly the ignition apparatus thereof, by water leaking through the joint is obviated.

In Fig. 5 is shown a slightly modified form of the device in which the floor 39 of the trough 37 is provided near its forward end with one or more suitable drain holes 51. In this form of the device the drain pipe 49 is dispensed with; water which drains to the forward end of the trough 37 passing through the holes 51 and dropping into the bottom of the engine compartment between the front of the engine 14 and the radiator 11.

It will be understood that various forms of the invention other than those described above may be used without departing from the spirit or scope of the invention.

What is claimed is:

1. In a motor vehicle having a radiator, a dash, an engine between the radiator and the dash, and a hinged bonnet supported between the radiator and the dash to cover the engine, a spacing member connecting the radiator and the dash to hold these members against relative movement and having a trough shaped portion disposed beneath the hinge of the bonnet.

2. In a motor vehicle having a radiator and a dash defining a compartment therebetween and a jointed bonnet over said compartment, an inclined drain member having a channel section beneath the joint and having end portions connected to the radiator and to the dash to space said radiator and dash, and means including a pipe communicating with the lower end of the drain member to permit the escape of water therefrom.

3. In a motor vehicle having a radiator and a dash and a jointed bonnet between the radiator and the dash, a rigid spacing member having end portions adapted for attachment to the radiator and to the dash respectively, and having an intermediate portion of channel section forming a drain trough beneath the joint of said bonnet.

4. In a motor vehicle having a radiator, a dash, and a hinged bonnet supported therebetween, a member disposed beneath the bonnet hinge between the radiator and the dash and removably secured at its ends to said radiator and dash to maintain the relative positions thereof, said member having its greater portion formed of a channel shaped trough having upturned flanges adapted to collect and drain away moisture passing through the bonnet hinge.

5. A brace member for motor vehicles adapted to act in both directions, comprising a channel member having upturned flanges forming a moisture collecting trough, and end portions rigidly secured to the channel member, one of said end portions being adjustable in length.

In testimony whereof I affix my signature.

ALFRED MOORHOUSE.